United States Patent
Eggler et al.

(10) Patent No.: US 9,447,704 B2
(45) Date of Patent: Sep. 20, 2016

(54) HEAT RECOVERY SYSTEM FOR AN INTERNAL COMBUSTION ENGINE

(71) Applicant: Mahle International GmbH, Stuttgart (DE)

(72) Inventors: Jochen Eggler, Ostfildern (DE); Alfred Elsaesser, Keltern (DE); Christian Maisch, Kirchheim (DE); Sascha Senjic, Stuttgart (DE)

(73) Assignee: Mahle International GmbH (DE)

( * ) Notice: Subject to any disclaimer, the term of this patent is extended or adjusted under 35 U.S.C. 154(b) by 133 days.

(21) Appl. No.: 14/328,660

(22) Filed: Jul. 10, 2014

(65) Prior Publication Data
US 2015/0013333 A1 Jan. 15, 2015

(30) Foreign Application Priority Data

Jul. 11, 2013 (DE) .................. 10 2013 213 575

(51) Int. Cl.
| | |
|---|---|
| *F01K 23/10* | (2006.01) |
| *F01K 23/14* | (2006.01) |
| *F04B 45/02* | (2006.01) |
| *F04B 43/00* | (2006.01) |
| *F01N 5/04* | (2006.01) |
| *F02G 5/02* | (2006.01) |

(52) U.S. Cl.
CPC ............ *F01K 23/101* (2013.01); *F01K 23/14* (2013.01); *F01N 5/04* (2013.01); *F04B 43/0054* (2013.01); *F04B 45/02* (2013.01); *F02G 5/02* (2013.01); *Y02T 10/166* (2013.01)

(58) Field of Classification Search
CPC .......... F01N 5/04; F02G 5/02; F01K 23/101; F01K 23/14; F04B 43/0054; F04B 45/02
See application file for complete search history.

(56) References Cited

U.S. PATENT DOCUMENTS

| | | | | |
|---|---|---|---|---|
| 2008/0008605 A1* | 1/2008 | Bauer et al. | ................. | 417/375 |
| 2011/0016863 A1 | 1/2011 | Ernst | | |

(Continued)

FOREIGN PATENT DOCUMENTS

| | | |
|---|---|---|
| DE | 1800143 A1 | 4/1970 |
| DE | 19610382 A1 | 9/1997 |

(Continued)

OTHER PUBLICATIONS

English Abstract for FR 2828240-A1.

(Continued)

*Primary Examiner* — Audrey K Bradley
(74) *Attorney, Agent, or Firm* — Fishman Stewart PLLC

(57) ABSTRACT

A heat recovery system for an internal combustion engine may include a heat transfer device flowed through by a fluidic heat carrier for transferring the heat from a combustion exhaust gas of the internal combustion engine to the heat carrier, a heat power machine flowed through by the heat carrier for converting the heat transferred to the heat carrier into mechanical work, a substantially cyclically closed duct system for connecting the heat transfer device with the heat power machine, at least one displacement pump for conveying the heat carrier through the duct system in a predetermined flow direction, and a pump drive for driving the displacement pump. A reduced wear may result when the heat recovery system is supplemented by an impermeable separating membrane for the fluid-tight separation of the heat carrier from the pump drive.

15 Claims, 3 Drawing Sheets

(56) References Cited

U.S. PATENT DOCUMENTS

| | | |
|---|---|---|
| 2013/0074497 A1 | 3/2013 | Mori et al. |
| 2013/0199173 A1* | 8/2013 | Voss et al. ............... 60/530 |
| 2013/0219882 A1* | 8/2013 | Jensen ..................... 60/604 |
| 2013/0333381 A1* | 12/2013 | Bourhis ................... 60/618 |
| 2014/0060044 A1* | 3/2014 | Gonze et al. ............ 60/615 |

FOREIGN PATENT DOCUMENTS

| | | |
|---|---|---|
| DE | 10035625 A1 | 2/2002 |
| DE | 10306146 A1 | 8/2004 |
| DE | 102010003537 A1 | 10/2011 |
| FR | 2828240 A1 | 2/2003 |
| WO | WO-90/04106 A1 | 4/1990 |

OTHER PUBLICATIONS

English Abstract for DE 10306146-A1.
English Abstract for DE 10035625A1.
European Search Report for EP 14172949 dated Nov. 21, 2014.
English abstract for DE-19610382.
English abstract for DE-102010003537.

\* cited by examiner

HEAT RECOVERY SYSTEM FOR AN INTERNAL COMBUSTION ENGINE

CROSS-REFERENCE TO RELATED APPLICATIONS

This application claims priority to German Patent Application No. 10 2013 213 575.0 filed Jul. 11, 2013, the contents of which are hereby incorporated by reference in their entirety.

TECHNICAL FIELD

The invention relates to a heat recovery system for an internal combustion engine.

BACKGROUND

An internal combustion engine is a combustion power machine which converts chemical energy of a fuel by combustion into mechanical work. The combustion takes place here in the combustion chamber, in which a mixture of fuel and ambient air is ignited. The thermal expansion of the combustion exhaust gas, which is hot through the combustion, is used in order to move a piston.

From the prior art in particular internal combustion engines are known which use up to 38.5% of the energy stored in the fuel for moving the piston. The remaining energy generated within the combustion—in the case of a cooled engine in addition to the cooling fluid—is discharged from the engine especially through escaping combustion exhaust gases. To reduce such heat losses, it was therefore proposed to supplement a generic internal combustion engine by a suitable heat recovery system.

Such a system typically uses a device designated as a heat transfer device, recuperator or heat exchanger, which transfers thermal energy from the combustion chamber of the engine to a heat carrier flowing around the latter. A problem here is the choice of the heat carrier, which is to be distinguished as such on the one hand by a high boiling point and heat transfer coefficient and high thermal capacity and conductivity, on the other hand by low viscosity, combustibility, toxicity and a low freezing point. Heat transfer devices known from the prior art therefore use, in addition to conventional cooling agents, for example water, ethanol, methanol, ammonia or mixtures based on these fluids as heat carrier.

Thus, for instance, U.S. 2008/0008605 A1 discloses a heat transfer device based on a pump, in which the movable part is a metal bellows, which is alternately filled with hydraulic fluid under high pressure and emptied. Here, the amount of fuel in the chamber in which the bellows moves is determined upstream by a magnet valve which is controlled by a computer for monitoring the engine. The proposed pump comprises at least two pump units which are supplied through a single inlet common to the two units.

FR 2 828 240-A1 also proposes a hydraulic pump for specific high pressure fluids such as petrol. Here, each cylinder of the hydraulic pump is connected on the one hand with a reservoir and on the other hand with a check valve, which selectively enter into fluid connection under the action of a distribution device controlled by means of a proportional magnet.

Finally, DE 103 06 146 A1 describes a low pressure reservoir for a high pressure piston pump for the pumping of fuel with a fluid-tight elastic separating structure, which has a first side and a second side, wherein the first side delimits a partial volume of the low pressure reservoir, which is connected hydraulically with a low pressure side of the high pressure piston pump. The low pressure reservoir is distinguished in that the elastic separating structure defines the partial volume in a gas-tight manner.

A disadvantage of these conventional heat recovery systems lies here in the long-term wear of the moving parts of the heat recovery system which are flowed around in such a way. In this respect, the named fluids have mostly physical characteristics with regard to density, viscosity, pour point, aniline point, dripping point and setting point and neutralization capacity, which show them to be of only limited suitability as lubricant. Also, the chemical compatibility with conventional drive components is not to be rated as non-critical in some of the heat carriers which are used. The tribological stress of the heat recovery system tends to be further intensified by the pressure level of the heat carrier necessary for operating the heat transfer device.

SUMMARY

The object of the invention is therefore the creation of a heat recovery system for an internal combustion engine, which overcomes the described disadvantage.

This problem is solved by a heat recovery system having the features of claim 1 the independent claims.

The basic idea of the invention is therefore to equip the heat recovery system with a displacement pump, the pump drive of which is separated from the heat carrier in a fluid-tight manner by an impermeable separating membrane. The medium separation which is thus achieved makes it possible for the specialist in the art to select a heat carrier which is optimized from functional considerations for filling the heat recovery system largely independently of the structural configuration of the pump drive, without the threat of a contact between heat carrier and pump drive with the possible consequence of for instance a chemical contact reaction. The use of a metallic material or corresponding plastics such as e.g. PTFE membranes is recommended here for the production of the separating membrane. Furthermore, correspondingly known metal compounds have a high ductility, so that a corresponding membrane under the periodic stresses occurring in the pump operation can run through numerous elastic deformation cycles, without its degree of tightness being noticeably impaired by the formation of fissures or other material failure. Corresponding plastics also have similar characteristics. Finally, the use of a metallic material opens up for the specialist in the art a plurality of metallurgical processing methods for the flexible configuration of a separating membrane.

In a preferred embodiment, the separating membrane forms here the wall of a metallic bellows. The use of such a bellows for sealing a pump was basically already discussed in DE 100 35 625 A1, wherein the cited published application proposes its use within the injection system of an internal combustion engine. The use of a bellows pump according to the invention for heat recovery transfers the advantage of an improved sealing of the pump chamber to the present scenario.

Such a pump drive can be based for instance on a reciprocating piston mounted movably in the bellows, wherein cavities remaining within the bellows between the reciprocating piston and the separating membrane are filled by means of a suitable hydraulic fluid. The force exerted by the reciprocating piston on driving of the displacement pump is transferred in this case via the hydraulic fluid to the bellows, the expansion of which in turn directly displaces the fluidic heat carrier, which flows around the bellows on the opposite side of the separating membrane. The described hydromechanical connection between drive and output permits for the specialist in the field of drive engineering an optimum structural adaptation of the heat recovery system to overriding spatial parameters. Nevertheless, in this way the comparatively great conveying capacity can be achieved, which the use of the displacement pump requires within heat recovery.

A tube-shaped chamber in the form of a cylinder, coupled fluidically with the duct system for instance serves here for the mounting of the reciprocating piston within the bellows. If the bellows is connected in a suitable manner with an end face of the cylinder via a hermetic closure, the described shaping guarantees a reliable linear guidance of the reciprocating piston with the exclusion of any contamination thereof by the heat carrier flowing around it.

The described fluid connection between cylinder and duct system can be realized in particular by means of a respectively valve-controlled feed and discharge. In this case, the feed- and discharge valves, embodied as check valves, are to be arranged so that their passage direction corresponds to the flow direction of the heat carrier within the duct system. This configuration avoids undesired changes of direction or turbulences of the heat carrier.

The volume flow and hence the conveying capacity of the displacement pump can be regulated in a particularly advantageous manner by the use of an actuating element which—for instance in the form of a suitable magnet valve—can assume an idle position, in which the driving work of the reciprocating piston does not act on the heat carrier present in the duct system. Such an idle state can be achieved on the one hand by a hydraulic short circuit of the displacement pump as a whole, on the other hand by the dynamic discharge of hydraulic fluid from the bellows, wherein the actuating element can free the corresponding short circuit- or discharge duct according to requirements or can block it for the respective fluid.

When the actuating element in this arrangement is combined with a suitable regulator, the volume flow of the heat carrier can be effectively reduced in that the regulator brings the actuating element temporarily into the described idle position on every stroke movement of the piston. The resulting heat recovery system fulfils the dynamic performance requirements of modern engines.

To reduce the tendency to pulsation, it is recommended to equip the heat recovery system with a plurality of such displacement pumps. It is left here to the design engineer of a heat recovery system according to the invention whether a single actuating element acts on all displacement pumps or whether each pump is allocated its own actuating element, so that the conveying capacity of the pumps can be adjusted separately.

The drive energy required for operating the displacement pumps can be obtained here in an advantageous manner from the internal combustion engine, the exhaust gases of which form the subject of the heat recovery. Alternatively, to increase the performance dynamics of the system as a whole, its own electric motor can be provided, which permits a use of the heat recovery system largely independent of the driving power of the internal combustion engine.

Further important features and advantages of the invention will emerge from the subclaims, from the drawings and from the associated description of the figures with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown respectively diagrammatically

DETAILED DESCRIPTION

Figure 1:
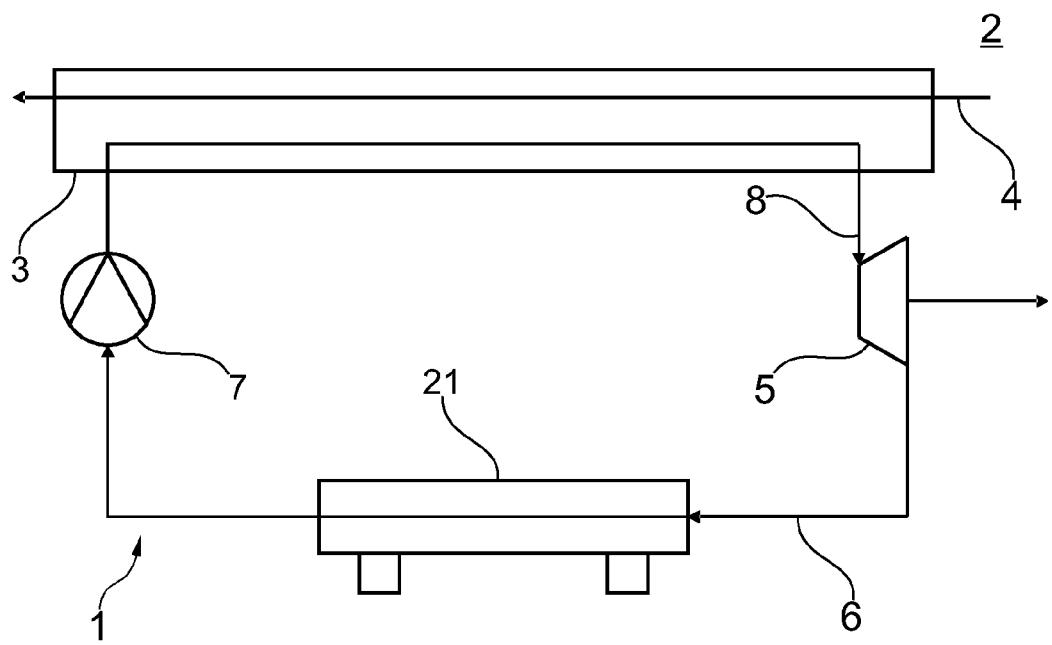
FIG. 1 the basic structure of a heat recovery system according to the invention, FIG. 2 the displacement pumps of a heat recovery system according to a first embodiment of the invention, FIG. 3 the displacement pumps of a heat recovery system according to a second embodiment of the invention, FIG. 4 the displacement pumps of a heat recovery system according to a third embodiment of the invention and FIG. 5 the displacement pumps of a heat recovery system according to a fourth embodiment of the invention.

FIG. 1 illustrates the basic structure of a heat recovery system 1 according to an embodiment of the invention, as can be used within a generic internal combustion engine 2 according to the invention. Basically any method for making reusable the thermal energy of a mass flow generated by the combustion process is to be understood as heat recovery (WRG, WHR). In the present scenario a stream of combustion exhaust gas 4 discharged from the internal combustion engine 2 is used for this.

The recuperative heat transfer device 3, which directs the exhaust gas stream—separated by a diathermic wall—past a heat carrier, serves for the transfer of the thermal energy transported by the combustion exhaust gas 4. The flow direction 8 of the heat carrier is directed here substantially contrary to the exhaust gas stream, so that the separated substance streams within the heat transfer device 3 form counter-currents in the sense of thermal engineering, which permit an adjustment of the temperature of the heat carrier to that of the exhaust gas 4.

For the purpose of guiding the heat carrier within the heat recovery system 1 a duct system 6 is provided here, closed to form a heat cycle, in which the heat carrier runs through a thermodynamic cyclic process during the operation of the heat recovery system 1. In this process, the fluidic heat carrier functioning as working medium performs a periodic sequence of changes of state, which in this illustration are initiated by the heating by means of the heat transfer device 3. Heated in such a way, the heat carrier flows in the flow direction 8, predetermined by the duct system 6, through a heat power machine 5, which converts the thermal energy transported by the heat carrier into kinetic energy and thus makes it useful as mechanical work. The heat power machine 5 has here the form of an expansion machine, which is driven by the heat carrier leaving the heat transfer device 3 typically in vapour form. Such a machine utilizes the thermodynamic energy embodied by the vapour pressure of the heat carrier, by transferring to an output the expansive force exerted on expansion of the vaporous heat transfer device by the latter.

The heat carrier emerging with reduced vapour pressure from the heat power machine 5 is now fed through the duct system 6 in the flow direction 8 to a condenser 21, which liquefies the exhaust vapour of the heat power machine 5 again. By the returning of the heat carrier from its gaseous state into the liquid aggregate state, the condenser 21 therefore closes, as it were, the described thermodynamic circuit of the heat recovery system 1. In order to maintain this cyclic process, displacement pumps 7 are integrated into the duct system 6 at a suitable position—in this case between the condenser 21 and the heat transfer device 3 supplied thereby—, which displacement pumps allow the heat carrier to circulate in the flow direction 8.

Figure 2:
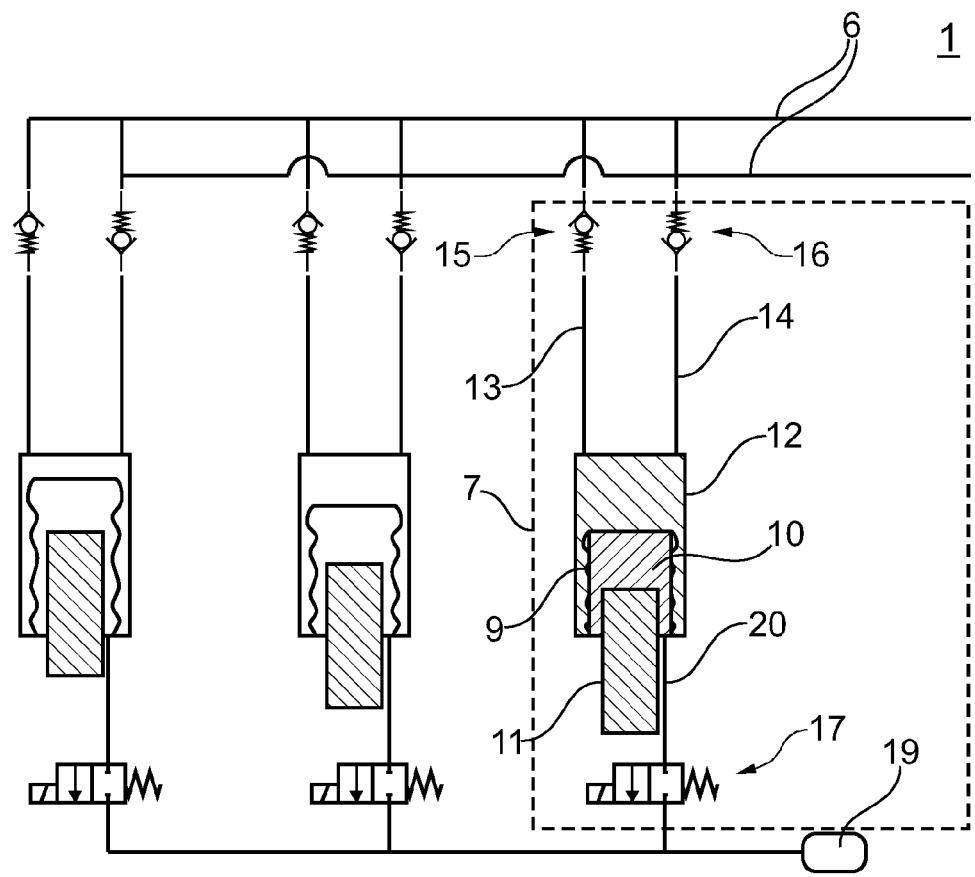

FIG. 2 illustrates the mode of operation in the example of a displacement pump 7 in detail. It can thus be seen that the displacement pump 7 aspirates the heat carrier via a feed 13 out from the duct system 6 into a cylinder 12 and discharges it via a complementary discharge 14 under increased pressure out from the cylinder 12 again. In order to guarantee the predetermined flow direction 8, both the feed 13 and also the discharge 14 are provided with correspondingly aligned check valves, the closing element of which is pressed into its valve seat in the respectively undesired contrary direction by an elastic element.

The separation of the heat carrier from the drive 10, 11 of the displacement pump 7, essential to the invention, manifests itself in this context, which separation is brought about in this case by means of a separating membrane 9 constructed as a metallic bellows, which seals the pump drive 10, 11 with respect to the heat carrier flowing through the cylinder 12. For this purpose, the wall of the bellows is formed by an elastic metal membrane which is folded together in the state of rest or expanded in the state of rest, which closes the movable parts of the pump drive 10, 11 hermetically with respect to the heat carrier. The inner side of the bellows is, rather, filled with a hydraulic fluid 10 in the form of a lubricating oil, thus separated materially from the heat carrier, which lubricating oil—supplied from an oil reservoir 19 connected with the bellows via a discharge line 20—permits the low-wear supporting of a reciprocating piston 11.

This reciprocating piston 11 forms, together with the hydraulic fluid 10 substantially filling the remaining cavities of the bellows, the pump drive 10, 11 of the displacement pump 7, by unfolding and folding the bellows, i.e. the separating membrane 9, by means of an oscillating movement via the hydraulic fluid 10. Whereas in the raising phase of the piston movement unfolding the bellows the heat carrier situated in the cylinder 12 is displaced here and discharged via the discharge 14, the corresponding lowering phase permits the inflow of the heat carrier, which is aspirated via the feed 13 into the cylinder 12.

A further distinctive feature of the invention, meanwhile, is represented by an actuating element 17—activated by means of a regulator, which is not illustrated—, which during the described stroke movement of the reciprocating piston 11 to reduce the conveying capacity of the displacement pump 7 can set the latter into an idle state. Basically any device which permits an influencing of the conveying capacity in the described sense is to be understood as an actuating element, setting device, actuator or actuating device. Here, a valve is used as actuating element 17, which can block or free the outflow of hydraulic fluid 10 through the discharge duct 20 in the direction of the fluid reservoir 19. In practical terms, this is the 2/2-way valve illustrated in FIG. 2, which is able to be activated electrically or—for instance as a fast-switching magnet valve—electromagnetically by the regulator. The use of a proportional valve which enables intermediate positions and therefore possibilities for regulation in particular for several reciprocating pistons would also be conceivable.

In the scenario of FIG. 2, the actuating element 17 is embedded, for this purpose, into the discharge duct 20, which it blocks in its starting position for hydraulic fluid 10 flowing back from the cylinder 12 in the direction of the fluid reservoir 19, so that the stroke movement of the reciprocating piston 11 is transferred hydromechanically to the bellows and via the latter to the heat carrier situated in the cylinder 12. When the actuating element 17 is now set into its idle position, it frees the discharge duct 20 in the direction of the fluid reservoir 19 for outflowing hydraulic fluid 10, so that a stroke movement of the reciprocating piston 11 does not steer the bellows to the usual extent and therefore leads to a reduced discharge of the heat carrier from the cylinder 12 and an accordingly reduced volume flow. Two further pistons, raised in turn by means of a wobble plate (not illustrated) operate in an analogous mode of operation further bellows pumps, which respectively have their own actuating element of this type.

Figure 3:
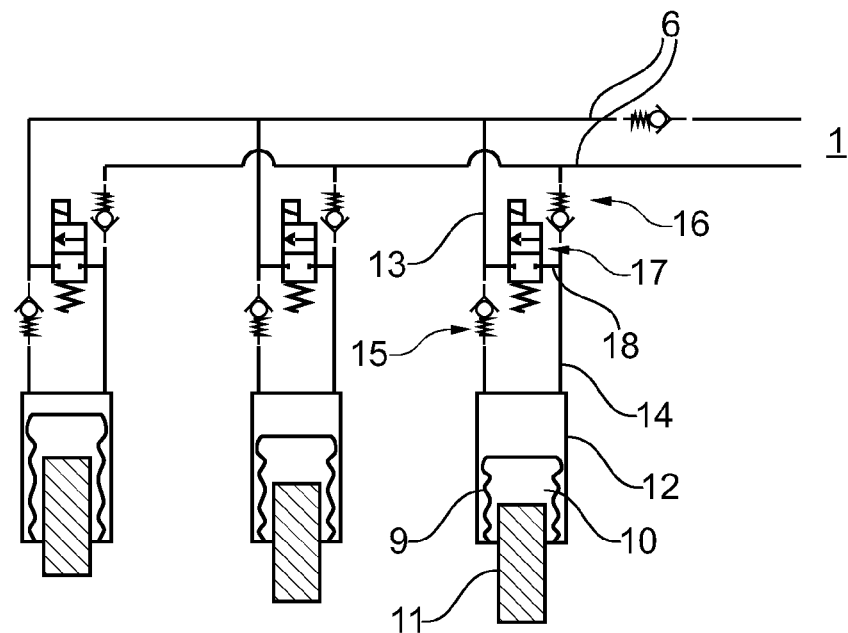

The alternative embodiment of FIG. 3 uses a different configuration of the actuating element 17, which is now embedded into a short circuit line 18 connecting the feed 13 with the discharge 14. In its starting position—corresponding to the maximum conveying capacity of the displacement pump 7—the actuating element 17 prevents here the flowing back of the heat carrier, displaced by the bellows during the stroke movement of the reciprocating piston 11, via the discharge 14, the short circuit line 18 and the feed 13 into the cylinder 12 by a blocking of the short circuit line 18. When, however, the actuating element is set into its idle position, it frees the short circuit line 18 in the described through-flow direction for the heat carrier discharged from the cylinder 12, so that a state results which is designated in fluid engineering as a hydraulic short circuit. In so doing, a portion of the heat carrier is directed in a circuit 11, 14, 18, 13, 11 separate from the duct system, so that a correspondingly reduced conveying capacity of the heat recovery system 1 results.

Figure 4:
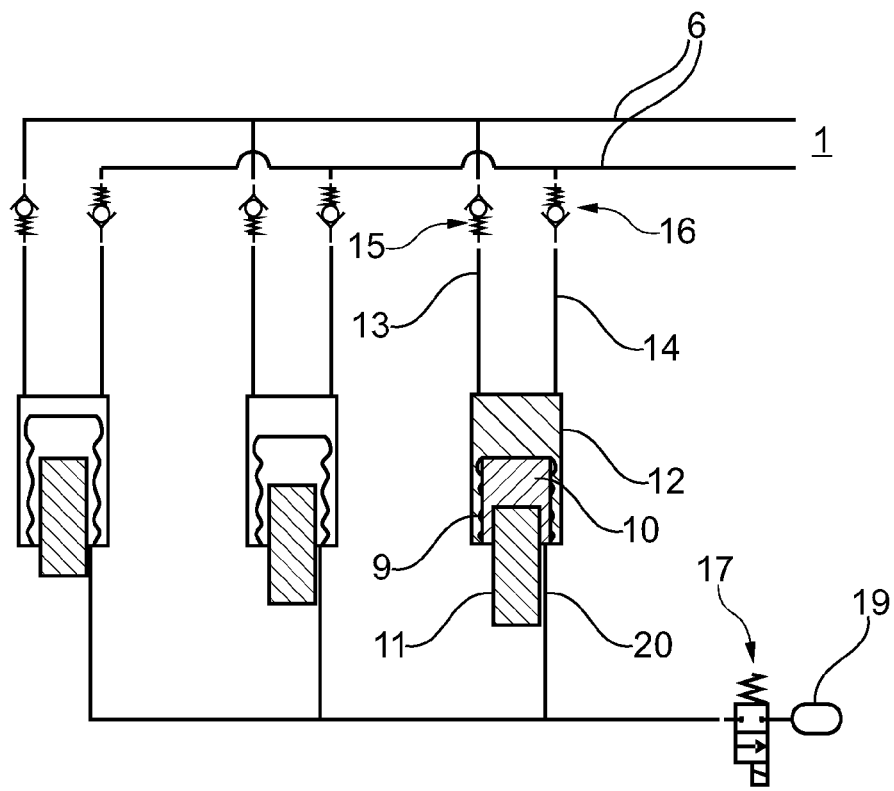

The mode of operation of the arrangement according to FIG. 4 corresponds here largely to that of FIG. 2, with the difference that not every individual one of the three displacement pumps which are shown has its own actuating element associated with it, but rather one actuating element acting on all displacement pumps is embedded in the shared part of the discharge duct 20.

Figure 5:
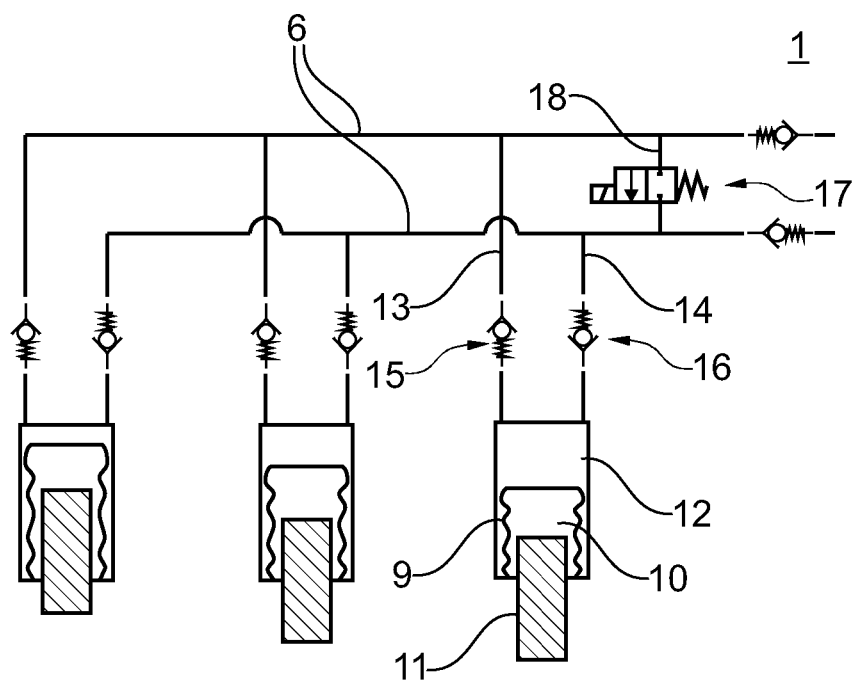

In an analogous manner, the heat recovery system 1 of FIG. 5 has only one single actuating element 17, which—in a manner corresponding to the configuration according to FIG. 2—acts on a short circuit line 18 connecting respectively shared sections of the feed 13 and discharge 14 of all displacement pumps.

The invention claimed is:

1. A heat recovery system for an internal combustion engine comprising:
   a heat exchanger, flowed through by a fluidic heat carrier, for transferring the heat from a combustion exhaust gas of the internal combustion engine to the heat carrier,
   an expansion turbine, flowed through by the heat carrier, for converting the heat transferred to the heat carrier into mechanical work,
   a cyclically closed duct system for connecting the heat exchanger with the expansion turbine,
   at least one displacement pump for conveying the heat carrier through the duct system in a predetermined flow direction, a pump drive for driving the at least one displacement pump, an impermeable separating membrane providing a fluid-tight separation of the heat carrier from the pump drive, a bellows surrounding the at least one displacement pump, the bellows having a wall that forms the separating membrane, a hydraulic fluid at least partially filling the bellows, a valve having a starting position, in which the at least one displacement pump conveys the heat carrier through the duct system, and an idle position, in which the at least one displacement pump does not convey the heat carrier through the duct system, and a discharge duct fluidly connecting the bellows with a fluid reservoir, for discharging the hydraulic fluid from the bellows, wherein the valve is configured so that in the starting position the valve blocks the discharge duct, and in the idle position the valve frees the discharge duct in the direction of the fluid reservoir.

2. The heat recovery system according to claim 1, further comprising a short circuit line fluidly connecting the feed with the discharge to hydraulically short circuit the at least one displacement pump, wherein the valve is configured so that:

in the starting position the valve blocks the short circuit line, and in the idle position the valve frees the short circuit line in the direction of the feed.

3. The heat recovery system according to claim 1, wherein the at least one displacement pump includes three displacement pumps each having a valve, which acts on the respective displacement pump.

4. The heat recovery system according to claim 1, wherein the at least one displacement pump includes three displacement pumps having a shared valve, which acts on each displacement pump.

5. The heat recovery system according to claim 1, wherein the pump drive is connected mechanically with the internal combustion engine.

6. The heat recovery system according to claim 1, wherein the valve is a proportional valve with at least 3 different adjustable opening positions.

7. The heat recovery system according to claim 6, further comprising a short circuit line fluidly connecting the feed with the discharge to hydraulically short circuit the at least one displacement pump, wherein the valve is configured so that:

in the starting position the valve blocks the short circuit line, and in the idle position the valve frees the short circuit line in the direction of the feed.

8. The heat recovery system according to claim 1, wherein the separating membrane is made of at least one of a metal and a plastic.

9. The heat recovery system according to claim 8, wherein the at least one displacement pump includes three displacement pumps each having a valve, which acts on the respective displacement pump.

10. The heat recovery system according to claim 8, wherein the at least one displacement pump includes three displacement pumps having a shared valve, which acts on each displacement pump.

11. The heat recovery system according to claim 1, wherein the pump drive comprises a reciprocating piston movably supported in the hydraulic fluid, so that a stroke movement of the reciprocating piston unfolds the bellows hydromechanically by means of the hydraulic fluid.

12. The heat recovery system according to claim 11, wherein the at least one displacement pump has a cylinder in fluid connection with the duct system, in which cylinder the reciprocating piston is mounted.

13. The heat recovery system according to claim 12, wherein the at least one displacement pump comprises:

a feed for aspirating the heat carrier, and a discharge for discharging the heat carrier, which connects the cylinder with the duct system.

14. The heat recovery system according to claim 13, wherein the at least one displacement pump comprises:

a feed valve for blocking the feed, and a discharge valve for blocking the discharge, wherein the feed valve and the discharge valve are spring-loaded check valves and respectively have a passage direction which corresponds to the flow direction.

15. A heat recovery system for an internal combustion engine comprising:

a heat exchanger through which a fluidic heat carrier is flowable, the heat exchanger being configured to transfer heat from a combustion exhaust gas of the internal combustion engine to the heat carrier;

an expansion turbine through which the heat carrier is flowable, the expansion turbine being configured to convert the heat transferred to the heat carrier by the heat exchanger into mechanical work;

a cyclically closed duct system connecting the heat exchanger with the expansion turbine;

at least one displacement pump configured to convey the heat carrier through the duct system in a predetermined flow direction;

a pump drive configured to drive the at least one displacement pump;

a bellows surrounding the pump drive, the bellows having a wall that forms an impermeable membrane providing a fluid-tight separation between the heat carrier and the pump drive;

wherein the pump drive comprises a hydraulic fluid at least partially filling the bellows, and a reciprocating piston movably supported in the hydraulic fluid, so that a stroke movement of the reciprocating piston unfolds the bellows hydromechanically by means of the hydraulic fluid;

a valve having a starting position, in which the at least one displacement pump conveys the heat carrier through the duct system, and an idle position, in which the at least one displacement pump does not convey the heat carrier through the duct system; and a discharge duct fluidly connecting the bellows with a fluid reservoir, for discharging the hydraulic fluid from the bellows, wherein the valve is configured so that in the starting position the valve blocks the discharge duct, and in the idle position the valve frees the discharge duct in the direction of the fluid reservoir.

\* \* \* \* \*